(12) United States Patent
Bickley

(10) Patent No.: US 10,982,858 B2
(45) Date of Patent: Apr. 20, 2021

(54) COMBUSTION STAGING SYSTEM

(71) Applicant: ROLLS-ROYCE PLC, London (GB)

(72) Inventor: Daniel J Bickley, Solihull (GB)

(73) Assignee: ROLLS-ROYCE plc, London (GB)

( * ) Notice: Subject to any disclaimer, the term of this patent is extended or adjusted under 35 U.S.C. 154(b) by 195 days.

(21) Appl. No.: 16/011,741

(22) Filed: Jun. 19, 2018

(65) Prior Publication Data
US 2018/0372320 A1 Dec. 27, 2018

(30) Foreign Application Priority Data

Jun. 23, 2017 (GB) .................................. 1710047

(51) Int. Cl.
| F23R 3/34 | (2006.01) |
| F02C 7/22 | (2006.01) |
| F02C 7/14 | (2006.01) |
| F02C 9/26 | (2006.01) |
| F02C 7/232 | (2006.01) |
| F02C 7/228 | (2006.01) |

(52) U.S. Cl.
CPC ............... F23R 3/346 (2013.01); F02C 7/14 (2013.01); F02C 7/222 (2013.01); F02C 7/228 (2013.01); F02C 7/232 (2013.01); F02C 9/263 (2013.01)

(58) Field of Classification Search
CPC .......... F02C 7/222; F02C 7/228; F02C 7/232; F02C 9/263; F23R 3/346
See application file for complete search history.

(56) References Cited

U.S. PATENT DOCUMENTS

| 4,337,616 A * | 7/1982 | Downing ................ F02C 9/34 60/39.281 |
| 4,949,538 A * | 8/1990 | Iasillo .................... F02C 7/228 60/39.465 |
| 4,992,027 A | 2/1991 | Acosta |
| 5,339,636 A | 8/1994 | Donnelly et al. |
| 5,442,922 A | 8/1995 | Dyer et al. |

(Continued)

FOREIGN PATENT DOCUMENTS

| GB | 2041085 A | 9/1980 |
| GB | 2532388 A | 5/2016 |

OTHER PUBLICATIONS

U.S. Appl. No. 16/012,054, filed Jun. 19, 2018 in the name of Daniel J Bickley.

(Continued)

*Primary Examiner* — Arun Goyal
(74) *Attorney, Agent, or Firm* — Oliff PLC

(57) ABSTRACT

A combustion staging system is provided for fuel injectors of a multi-stage combustor of a gas turbine engine. The system has a splitting unit which receives a metered total fuel flow and controllably splits the metered total fuel flow into out-going pilot and mains fuel flows to perform pilot-only and pilot-and-mains staging control of the combustor. The splitting unit includes a metering valve and a spill valve, a first portion of the total metered fuel flow received by the splitting unit being an inflow to the metering valve and a second portion of the total metered fuel flow received by the splitting unit being an inflow to the spill valve. The metering valve is configured to controllably determine a fuel flow rate of a metered outflow formed from the first portion of the total metered fuel flow.

13 Claims, 4 Drawing Sheets

(56) References Cited

U.S. PATENT DOCUMENTS

| | | | |
|---|---|---|---|
| 5,881,550 A | 3/1999 | Toelle | |
| 6,955,040 B1 | 10/2005 | Myers, Jr. et al. | |
| 8,192,172 B2 | 6/2012 | Baker et al. | |
| 8,887,752 B2 | 11/2014 | Rawlinson | |
| 8,925,322 B2 * | 1/2015 | Scully | F02C 9/34 60/734 |
| 9,121,349 B2 | 9/2015 | Griffiths et al. | |
| 9,404,423 B2 * | 8/2016 | Griffiths | F02C 7/228 |
| 9,574,448 B2 * | 2/2017 | Snodgrass | F01D 5/147 |
| 10,288,294 B2 | 5/2019 | Griffiths et al. | |
| 10,294,866 B2 | 5/2019 | Baker | |
| 2011/0146823 A1 | 6/2011 | Griffiths et al. | |
| 2011/0289925 A1 | 12/2011 | Dyer et al. | |
| 2012/0159953 A1 | 6/2012 | Griffiths et al. | |
| 2013/0042920 A1 | 2/2013 | Snodgrass et al. | |
| 2015/0192075 A1 | 7/2015 | Griffiths | |
| 2016/0273775 A1 | 9/2016 | Griffiths et al. | |
| 2017/0298840 A1 | 10/2017 | Doody | |

OTHER PUBLICATIONS

U.S. Appl. No. 16/011,865, filed Jun. 19, 2018 in the name of Martin K Yates et al.
U.S. Appl. No. 16/012,436, filed Jun. 19, 2018 in the name of Michael Griffiths.
May 29, 2020 Office Action issued in U.S. Appl. No. 16/012,054.
Jun. 18, 2020 Office Action Issued in U.S. Appl. No. 16/011,865.
Jun. 24, 2020 Office Action issued in U.S. Appl. No. 16/012,436.
Oct. 14, 2020 Office Action issued in U.S. Appl. No. 16/011,865.
Dec. 16, 2020 Office Action issued in U.S. Appl. No. 16/012,436.

* cited by examiner

COMBUSTION STAGING SYSTEM

FIELD OF THE INVENTION

The present invention relates to a combustion staging system for fuel injectors of a multi-stage combustor of a gas turbine engine.

BACKGROUND

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging condition.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the injectors, a check valve, known as a flow scheduling valve (FSV), is typically associated with each feed in order to retain a primed manifold when de-staged and at shut-down. The FSVs also prevent fuel flow into the injector nozzle when the supply pressure is less than the cracking pressure (i.e. less than a given difference between manifold pressure and combustor gas pressure).

Multi-stage combustors may have further stages and/or manifolds. For example, the pilot manifold may be split into two manifolds for lean blow-out prevention during rapid engine decelerations.

During pilot-only operation, the splitter valve directs fuel for burner flow only through the pilot fuel circuit (i.e. pilot manifold and feeds). It is therefore conventional to control temperatures in the de-staged (i.e. mains) fuel circuit to prevent coking due to heat pick up from the hot engine casing. One known approach, for example described in EP A 2469057, is to provide a separate recirculation manifold which is used to keep the fuel in the mains manifold cool when it is deselected. It does this by keeping the fuel in the mains manifold moving, although a cooling flow also has to be maintained in the recirculation manifold during mains operation to avoid coking.

However, a problem with such a system is how to accommodate a mains FSV failing to an open condition. In pilot-only operation, when cooling flow is passing through the recirculation manifold and the mains manifold, such a failure can result in the cooling flow passing through the failed open FSV through one injector into the combustor, causing a hot streak which may lead to nozzle and turbine damage. In pilot and mains operation, such a failure can produce a drop in mains manifold pressure which causes other mains FSVs to close. A possible outcome is again that a high proportion of the total mains flow passes through the failed open FSV to one injector, causing a hot streak leading to nozzle and turbine damage In principle, such failure modes can be detected by appropriate thermocouple arrangements, e.g. to detect hot streaks. However, temperature measurement devices of this type can themselves have reliability issues.

Further, the problem of mains FSV failure can be exacerbated by system arrangements used to prevent combustion chamber gas ingress through the fuel injectors during pilot only operation. Whilst the impact of such gas ingress is generally non-hazardous, it can lead to hot gas-induced degradation of FSV seals. Degraded FSV sealing can in turn lead to dribbling of fuel into de-staged nozzles, resulting in component blockage due to coking.

U.S. 2016/0273775 proposes a fuel staging system (reproduced in FIG. 1) that addresses some of the above problems. The staging system splits the fuel under the control of the engine electronic controller (EEC—not shown) into two flows: one at a pressure $PB_{p1}$ for first 131 and second 132 pilot manifolds and the other at a pressure $P_{fsv}$ for a mains manifold 133. The first pilot manifold feeds pilot discharge orifices of a subset of the fuel injectors. The second pilot manifold feeds pilot discharge orifices of the rest of the fuel injectors. The mains manifold feeds mains discharge orifices of all the fuel injectors. Mains fuel flow scheduling valves (FSVs) 140 at the injectors prevent combustion chamber gases entering the respective manifolds and also provide a drip tight seal between the mains manifold and the injectors when mains is de-staged. By varying the fuel split between the manifolds, the EEC can thus perform staging control of the engine.

In more detail, the staging system 130 has a fuel flow splitting valve (FFSV) 135, which receives a metered fuel flow from a hydro-mechanical unit (HMU) of the engine at pressure $P_{fmu}$. A spool is slidable within the FFSV under the control of a servo-valve 146, the position of the spool determining the outgoing flow split between a pilot connection pipe 136 which delivers fuel to the first 131 and second 132 pilot manifolds and a mains connection pipe 137 which delivers fuel to the mains manifold 133. The spool can be positioned so that the mains stage is deselected, with the entire metered flow going to the pilot stage (except that a cooling flow is sent to the mains manifold during pilot-only operation, as discussed in more detail below). An LVDT (not shown) can provide feedback on the position of the spool to the EEC, which in turn controls staging by control of the servo-valve 146.

The pilot discharge orifices are divided into two groups by the first 131 and second 132 pilot manifolds in order to provide lean blow out protection. More particularly, the second pilot manifold connects to the pilot connection pipe 136 via a further connection pipe 139 (at a pressure $PB_{p2}$) and a lean blow out protection valve 141. This is operable to terminate or substantially reduce the supply of fuel to the second pilot manifold and associated pilot discharge orifices, when desired, so as to increase the flow of fuel to the first pilot manifold and associated discharge orifices under low fuel conditions for a given metered flow from the HMU. In the arrangement illustrated, the valve 141 is controlled by way of a solenoid operated control valve 142, although other forms of control are possible, such as by a servo-type valve (for example an electro hydraulic servo-valve). In this way, under low fuel conditions the flow of fuel to the pilot discharge orifices may be directed preferentially via the first pilot manifold, whereby the risk of a lean blow out condition arising can be reduced. Further details of such lean blow out protection are described in EP A 2469057.

The part of the staging system 130 comprising the FFSV 135, servo-valve 146, lean blow out protection valve 141 and control valve 142 may be housed in a staging unit mounted to a fan case of the engine. The connection pipes 136, 137, 139 then extend across a bypass duct of the engine to the manifolds 131, 132, 133, which wrap around the core engine in proximity to the injectors 134. Alternatively, the staging system can be mounted to the engine core.

In the staging system described in EP A 2469057, each injector has a pilot FSV and a mains FSV for respectively the flows from pilot and mains manifolds. In contrast, in the staging system shown in FIG. 1, pilot FSVs are not necessary (although optional pilot FSVs can be located between the mains FSVs 140 and the pilot discharge orifices), and instead pilot flow is routed through modified mains FSVs 140 with negligible restriction: the mains FSVs 140 distribute the mains flow from the mains manifold 133 to the mains discharge orifices in the injectors 134, while the pilot flow is passed through the mains FSVs for valve cooling purposes. These FSVs each have a chamber containing a movable, spring-biased piston, with the chamber to a pilot (spring) side of the piston being in fluid communication with the respective pilot fuel manifold 131, 132 and the chamber to a mains (non-spring) side of the piston being in fluid communication with the mains fuel manifold 133. In this way, the FSVs 140 have a reduced cracking pressure with the pilot (spring) side of the FSVs being referenced to pilot manifold pressure ($PB_{p1}$ or $PB_{p2}$) rather than the lower mains pressure downstream of the FSVs (as is the case with the system of EP A 2469057). With the low cracking pressure, the pressures on either side of each piston ($P_{fsv}$ and $PB_p$) are approximately equal during the pilot-only operating mode such that the FSV springs maintain the FSVs 140 in a closed position (i.e. no flow from the mains manifold 133 through the FSVs to the mains discharge orifices of the injectors 134). The approximate equalisation of the pressures $P_{fsv}$ and $P_{bp}$ is achieved by energising open a single-stage solenoid-operated mains cooling valve 147 which allows a small cooling flow through the mains manifold 133 to pass to the second pilot manifold 132 through a port in the solenoid valve 147 that is significantly larger than the port in the FFSV 135 feeding the mains connection pipe 137.

In this pilot-only operating mode, the position of the FFSV 135, controlled by the servo-valve 146, is such that there is a large flow number opening between the HMU supply and the pilot connection pipe 136, such that $P_{fmu} \approx PB_p \approx P_{fsv}$. Any difference between the metered fuel pressure ($P_{fmu}$) from the HMU supply and the pilot manifold pressures ($PB_{p1}$ and $PB_{p2}$) is insufficient to open the FSVs 140. In the pilot-only mode there is a small opening in the FFSV between the HMU supply and the mains connection pipe 137 to allow for the cooling flow in the mains manifold 133. The mains manifold remains fully primed in pilot-only mode to reduce the unprimed volume required to be filled when mains flow to the combustor is required. When mains staging is selected solenoid-operated mains cooling valve 147 is closed so that the connection between the mains manifold 133 and the second pilot manifold 132 is closed. Simultaneously, the FFSV 135 (controlled by the servo-valve 146) moves to increase the opening between the HMU supply and the mains connection pipe 137. This reduces $PB_{p1}$ and $PB_{p2}$ relative to $P_{fsv}$, resulting in fuel flow to the mains discharge orifices of the injectors 134.

If one of the FSVs 140 fails such that it opens in pilot-and-mains mode, fuel flows from the HMU supply through the FFSV 135 to the mains manifold 133 and thence through the open port in the failed FSV to the mains discharge orifice of the respective injector 134. However, as the FSVs have a relatively low cracking pressure, only a marginal increase in pressure in the mains manifold, resulting from flow through the port in the failed FSV, causes the other FSVs to open. This then leads to a relatively even distribution of fuel flow injection around the combustor. Thus, by ensuring that the other FSVs open before a severe level of fuel flow through the failed FSV is reached (i.e. a level that results in hot streaks and turbine damage), the staging system 130 can mitigate the potentially hazardous mal-distribution issues associated with failed open mains FSVs in the system of EP A 2469057. The latter incorporates high cracking pressure FSVs, potentially allowing a high level of flow to pass through a single failed open FSV (i.e. gross maldistribution) before the other FSVs crack open.

The staging system 130 also allows complex cooling recirculation architectures to be avoided, which avoids the hazards that can result from combustion gases leaking past mains FSVs and thence to the low pressure side of the fuel system of the system.

Cooling of the FSVs 140 can be provided by the pilot flow that is continuously routed through the FSVs. Cooling arrangements can be provided for the pilot manifolds 131, 132 and the mains 133 manifold, e.g. by using a small portion of the air flow through a bypass duct of the engine, and for the mains manifold in pilot-only operation using the cooling flow discussed below.

The pilot/mains flow split is achieved via movement of the spool within the FFSV 135, with a mains fuel flow sensing valve (MFFSV) 143 being provided on the mains connection pipe 137. The FFSV 135 then provides a coarse split and the MFFSV trims to the required accuracy. The position of the FFSV 135 is controlled via the servo-valve 146 using the position feedback signal from the LVDT 144 attached to the MFFSV 143 to give accurate flow control in the connection pipes 136 and 137. In particular, the position feedback signal that is input to the staging control logic in the EEC is taken from an LVDT 144 measuring a spool position of the MFFSV rather than a spool position of the FFSV. In such an arrangement, MFFSV spool position is a measure of the mains flow.

To provide the cooling flow in the mains manifold 133 during pilot-only operation, the single-stage solenoid-operated mains cooling valve 147 opens a bypass connection between the mains 133 and second pilot 132 fuel manifolds, allowing the cooling flow to pass from the mains fuel manifold to the pilot fuel manifold, and thence onwards for burning at the pilot orifices of the injectors 134. The mains cooling valve 147 closes during pilot-and-mains operation. The mains cooling valve has a relatively large minimum orifice size, and thus is relatively insensitive to contamination and ice build-up.

In the pilot-only operating mode, the cooling flow of fuel passes continuously from the mains manifold 133 to the second pilot fuel manifold 132, which maintains cooling in the mains manifold. This cooling flow is sensed by the MFFSV 143 and the feedback signal from the MFFSV LVDT 144 to the EEC is used to adjust the spool position of the FFSV 135 (via the servo-valve 146) if the cooling flow needs to be altered. In pilot-only operating mode, even with the cooling flow the pressure drop across each FSV piston ($P_{fsv} - PB_p$) is insufficient to open the FSVs.

When the pilot-and-mains operating mode is selected, the solenoid operated mains cooling valve 147 is closed, and the spool position of the FFSV 135 is altered to increase the opening of the mains port of the FFSV and reduce the opening of the pilot port of the FFSV, which increases the pressure differential $P_{fmu} - PB_{p1}$ across the pilot port, thus producing a rise in pressure $P_{fsv}$ relative to $PB_{p1}$ and $PB_{p2}$.

This results in the pistons of the FSVs 140 opening against their respective spring forces, and fuel flowing through the FSVs to the mains discharge orifices of the injectors 134. The MFFSV 143 now senses the flow to the mains discharge orifices of the injectors and the feedback signal from the LVDT 144 is used to adjust the FFSV spool position via the EEC and FFSV servo-valve 146 to set the correct pilot/mains flow split.

Thus inclusion of the MFFSV 143 on the mains connection pipe 137 enables accurate control of the pilot/mains split irrespective of FSV tolerances, variation and friction. The MFFSV position from the LVDT 144 is a measure of mains manifold cooling flow during pilot-only operation, and total mains burnt flow during pilot-and-mains operation. This flow measurement signal is sent to and used by the EEC control logic to provide an MFFSV position demand signal that is used to drive the FFSV servo-valve 146 to move the FFSV 135 to set the correct pilot/mains flow split (during pilot-and-mains operation) or the correct mains cooling flow (during pilot-only operation).

Although the fuel staging system of U.S. 2016/0273775 addresses many of the problems of the system of EP A 2469057, a difficulty arises in that the closed loop control of the fuel split using the MFFSV 143 also involves the EEC. In particular, the digital sample and hold processes of the EEC introduce phase lag in any control loop using the EEC. This limits the maximum gain that can be set within the loop, given loop stability considerations, and thus limits response of the closed loop. Typical sample periods for the EEC limit loop bandwidth to 1-2 Hz, which may not be fast enough for accurate dynamic control of fuel flow to the engine.

SUMMARY

In a first aspect, the present invention provides a combustion staging system for fuel injectors of a multi-stage combustor of a gas turbine engine, the system having:
- a splitting unit which receives a metered total fuel flow and controllably splits the metered total fuel flow into out-going pilot and mains fuel flows to perform pilot-only and pilot-and-mains staging control of the combustor;
- wherein the splitting unit includes a metering valve and a spill valve, a first portion of the total metered fuel flow received by the splitting unit being an inflow to the metering valve and a second portion of the total metered fuel flow received by the splitting unit being an inflow to the spill valve, the metering valve being configured to controllably determine a fuel flow rate of a metered outflow formed from the first portion of the total metered fuel flow, the spill valve being configured to produce a spilled outflow formed from the second portion of the total metered fuel flow, and the spill valve being further configured to sense a pressure differential between the inflow to and the metered outflow from the metering valve and to vary the amount of the spilled outflow in response to the sensed pressure differential, whereby the metered outflow forms one of the pilot and mains fuel flows, and the spilled outflow forms the other of the pilot and mains fuel flows.

Advantageously, the metering valve and the spill valve of the splitting unit can provide purely hydro-mechanical closed loop control of the fuel split. The higher bandwidth of this form of control facilitates more accurate dynamic control of fuel flow to the engine. The use of such a splitting unit can also reduce the sensitivity of the fuel split to changes in the flow characteristics of downstream components, such as the burner nozzles, which may block progressively over time.

In a second aspect, the present invention provides a fuel supply system having:
- a total fuel metering valve which is configured to receive a flow of pressurised fuel and to form therefrom a metered total fuel flow; and
- a combustion staging system according to the first aspect, the splitting unit of the combustion staging system receiving the metered total fuel flow from the fuel metering valve.

The fuel supply system may further have a pressure drop control arrangement (such as another spill valve and a pressure drop control valve) which is operable to maintain a substantially constant pressure drop across the total fuel metering valve. The fuel supply system may further have a pressure raising and shut-off valve in the flow path of the metered total fuel flow between the total fuel metering valve and the combustion staging system.

In a third aspect, the present invention provides a gas turbine engine having the fuel supply system of the second aspect.

Optional features of the invention will now be set out. These are applicable singly or in any combination with any aspect of the invention.

Preferably, the metered outflow forms the mains fuel flow, and the spilled outflow forms the pilot fuel flow. This allows the mains fuel flow to be controlled more accurately, which can be particularly beneficial for control of cooling when mains is de-staged. This does not exclude, however, that the metered outflow can form the pilot fuel flow, and the spilled outflow can form the mains fuel flow.

The metering valve may have a spool whose position is controllable to determine the fuel flow rate of the metered outflow. For example, the position of the spool may be controlled by a servo-valve, e.g. under the command of the engine electronic controller. The metering valve may further have a device to measure the position of the spool. This position measurement can be fed to the engine electronic controller for use in controlling the spool velocity.

The staging system may further have pilot and mains fuel manifolds which respectively receive the pilot and mains fuel flows. The splitting unit may then send a cooling flow to the mains fuel manifold during pilot-only operation. In this case, the system may further have a mains cooling valve which, during pilot-only operation, opens a bypass connection between the mains and pilot fuel manifolds such that the cooling flow passes from the mains fuel manifold to the pilot fuel manifold. The cooling flow through the mains fuel manifold in the pilot-only mode then helps to avoid coking in the mains manifold when the mains flow scheduling valves are in their pilot-only positions. Advantageously, the cooling flow can pass to pilot discharge orifices of the injectors for burning in the combustor, such that the correct staging split is maintained.

According to one option for the cooling flow, the spill valve of the splitting unit can send some or all of the cooling flow to the mains fuel manifold during pilot-only operation. In particular, the spill valve may receive a third portion of the total metered fuel flow (e.g. through a fixed servo orifice) and may form some or all of the cooling flow therefrom. Additionally or alternatively, (particularly applicable when the metered outflow forms the mains fuel flow) the metering valve may send some or all of the cooling flow to the mains fuel manifold during pilot-only operation.

When the combustion staging system has the mains cooling valve, the system may further have a non-return valve in the bypass connection which prevents flow in the direction from the pilot fuel manifold to the mains fuel manifold.

When the combustion staging system has the mains cooling valve, it may be located at the base of the engine. This can help to reduce engine heat soak-back into the valve.

The staging system may further have a plurality of mains flow scheduling valves which distribute the mains fuel flow from the mains manifold to mains discharge orifices of respective injectors of the combustor. For example, each mains flow scheduling valve may have a chamber containing a movable piston, the chamber to a mains side of the piston being in fluid communication with the mains fuel manifold, the piston being biased towards a closed pilot-only position which prevents flow out of the mains side of the chamber to the mains discharge orifice of the respective injector, and the piston being movable under an increase in pressure in the mains fuel manifold to an open pilot-and-mains position which allows flow out of the mains side of the chamber to the mains discharge orifice of the respective injector.

Such mains flow scheduling valves may also pass the pilot fuel flow from the pilot manifold to pilot discharge orifices of the respective injectors. For example, the chamber to a pilot side of the piston may be in fluid communication with the pilot fuel manifold. Each mains flow scheduling valve may then provide a leak-tight seal between the pilot and mains sides of the chamber when its piston is in its pilot-only position, and a reduced seal between the pilot and mains sides of the chamber when the piston is in its pilot-and-mains position. For example, the piston may be dual face-sealed in the chamber. Some fuel may thus leak from pilot pressure to mains via clearance between the piston and its sleeve during pilot-and-mains operation. However, improved reliability of piston movement within the chamber may compensate for this disadvantage.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 2:
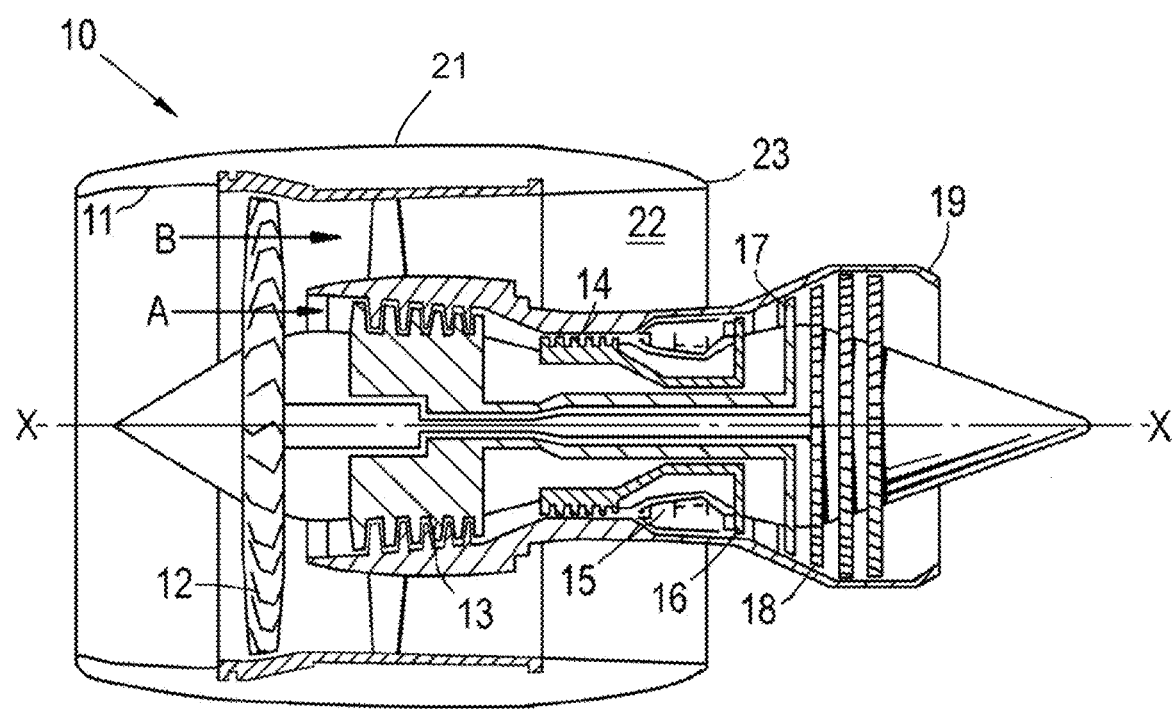
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts. Although FIG. 2 shows a three spool turbofan engine, the present invention is equally applicable to other engine architectures, such as two or single spool engines, and/or geared fan engines.

The engine has a pumping unit comprising a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

A fuel supply system then accepts fuel from the HP pumping stage for feeds to the combustor 15 of the engine 10. This system typically has a hydro-mechanical unit (HMU) comprising a fuel metering valve operable to control the rate at which fuel is allowed to flow to the combustor. The HMU may further comprise a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof in a filtered servo flow for correct operation of any fuel pressure operated auxiliary devices (such variable inlet guide vane or variable stator vane actuators) that receive fuel under pressure from the HMU. Further details of such an HMU are described in EP A 2339147.

An engine electronic controller (EEC—not shown) commands the HMU fuel metering valve to supply fuel at a given flow rate to a staging system 30 (shown schematically in FIG. 3) and thence to fuel injectors 34 of the combustor 15. The metered total fuel flow leaves the HMU and arrives at the staging system at a pressure $P_{fmu}$.

Figure 1:
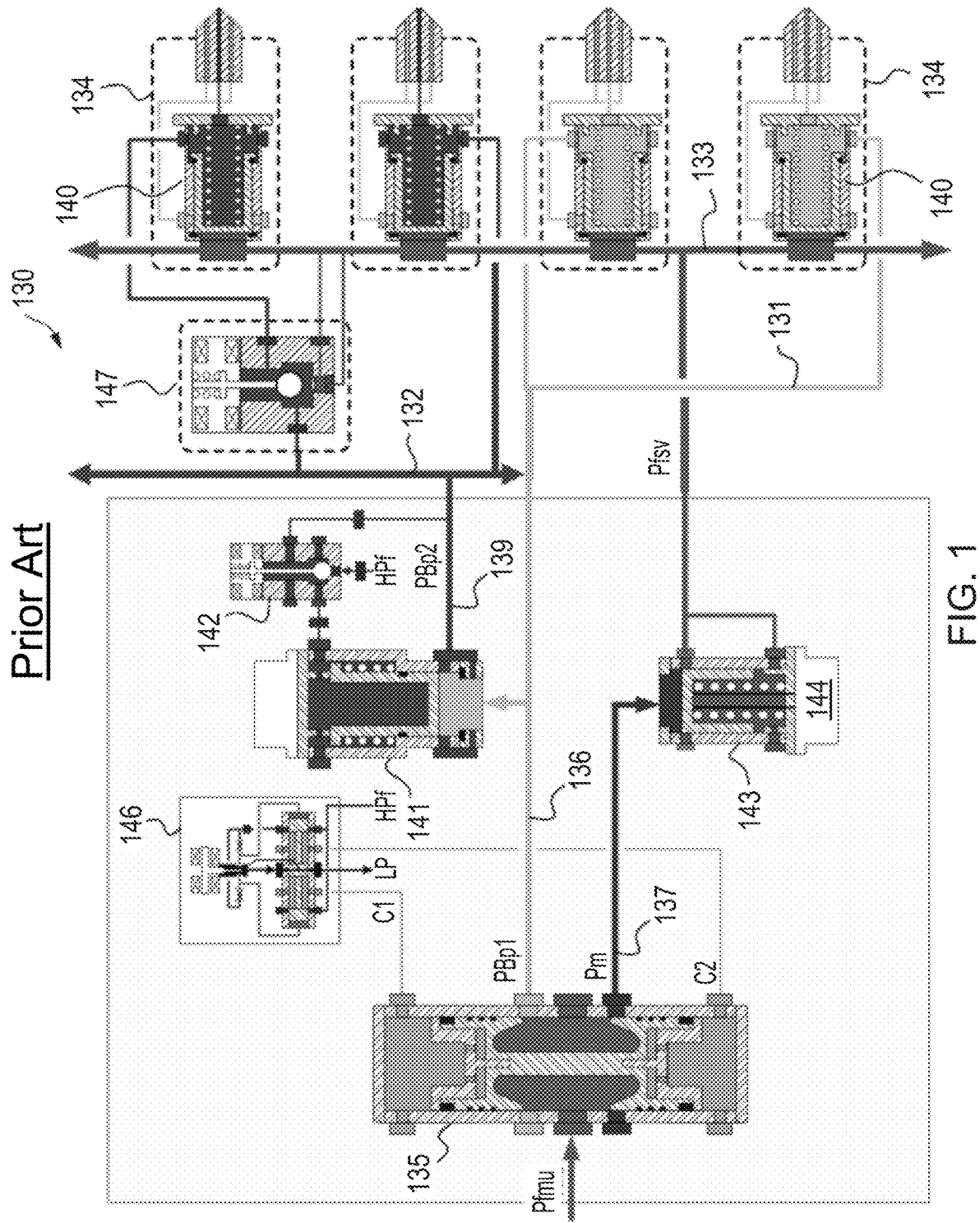
FIG. 1 shows schematically a known staging system for fuel injectors of the combustor of a gas turbine engine of FIG. 1 in pilot-only operating mode.

Parts of the staging system 30 are similar or identical to the corresponding parts of the known system 130 shown in FIG. 1. Thus the staging system 30 splits the fuel under the control of the EEC into two flows: one for first 31 and second 32 pilot manifolds and the other for a mains manifold 33. The first pilot manifold feeds pilot discharge orifices of a subset of the fuel injectors. The second pilot manifold feeds pilot discharge orifices of the rest of the fuel injectors. The mains manifold feeds mains discharge orifices of all the fuel injectors. Mains FSVs 40 are provided at the injectors. A splitting unit 50 (described in more detail below) receives the metered total fuel flow from the HMU and produces an outgoing flow split between a pilot connection pipe 36 which delivers fuel to the first 31 and second 32 pilot manifolds and a mains connection pipe 37 which delivers fuel to the mains manifold 33. The second pilot manifold 32 connects to the pilot connection pipe 36 via a further connection pipe 39 and a lean blow out protection valve 41 controlled by way of a solenoid-operated control valve 42. The splitting unit also sends a cooling flow to the mains manifold during pilot-only operation.

The mains FSVs 40 distribute the mains flow from the mains manifold 33 to the mains discharge orifices in the injectors 34, while the pilot flow is passed through the FSVs for valve cooling purposes. The FSVs each have a chamber containing a movable, spring-biased piston, with the chamber to a pilot (spring) side of the piston being in fluid communication with the respective pilot fuel manifold 31, 32 and the chamber to a mains (non-spring) side of the piston being in fluid communication with the mains fuel manifold 33.

The system 30 has a single-stage solenoid-operated mains cooling valve 47 which in pilot-only operation opens a bypass connection between the mains 33 and second pilot 32 fuel manifolds, allowing the cooling flow sent to the mains manifold 33 during pilot-only operation to pass from the mains fuel manifold to the pilot fuel manifold, and thence onwards for burning at the pilot orifices of the injectors 34. The mains cooling valve 47 closes during pilot-and-mains operation.

Figure 3:
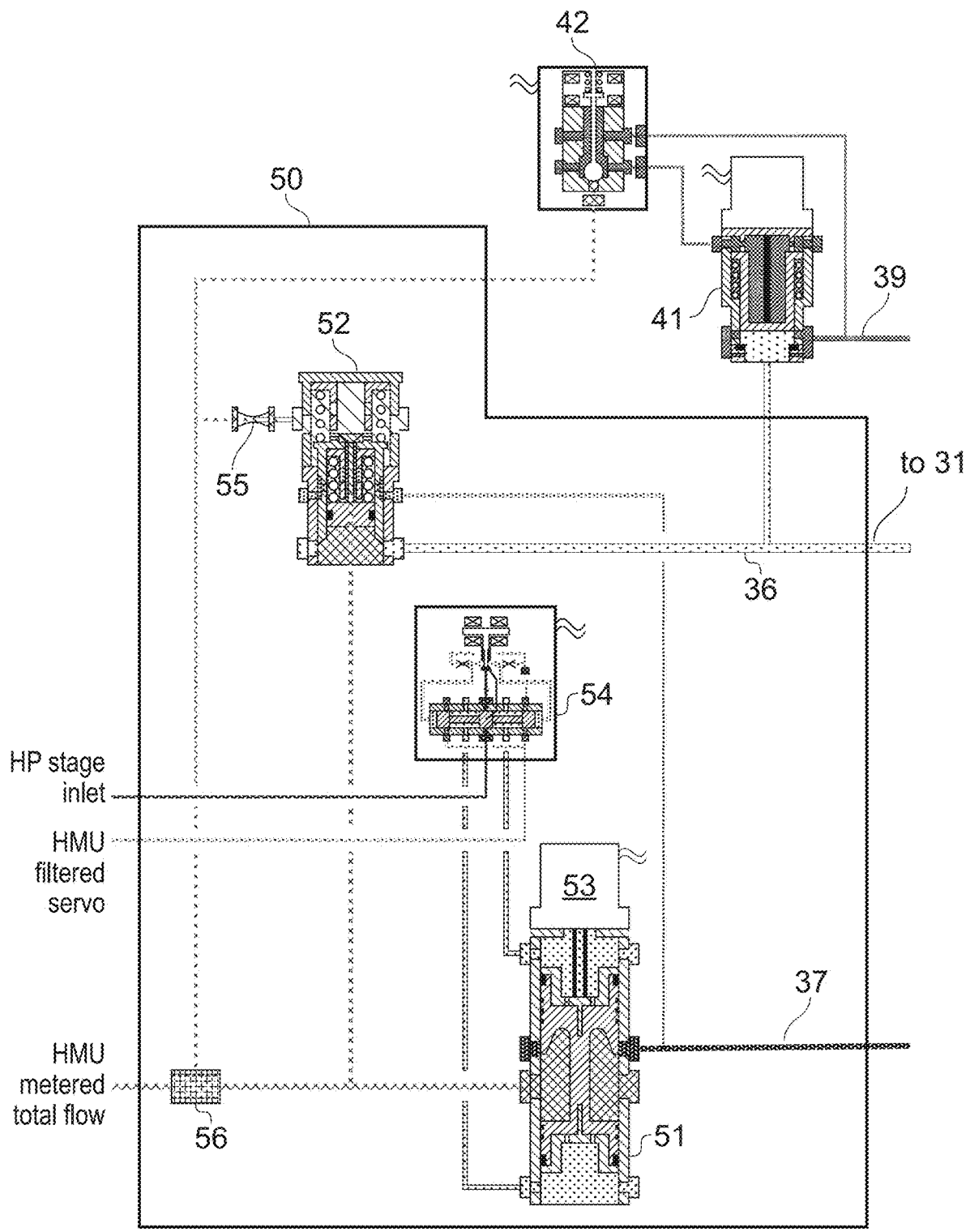
FIG. 3 shows schematically a staging system for fuel injectors of the combustor of the engine of FIG. 2.
Figure 3:
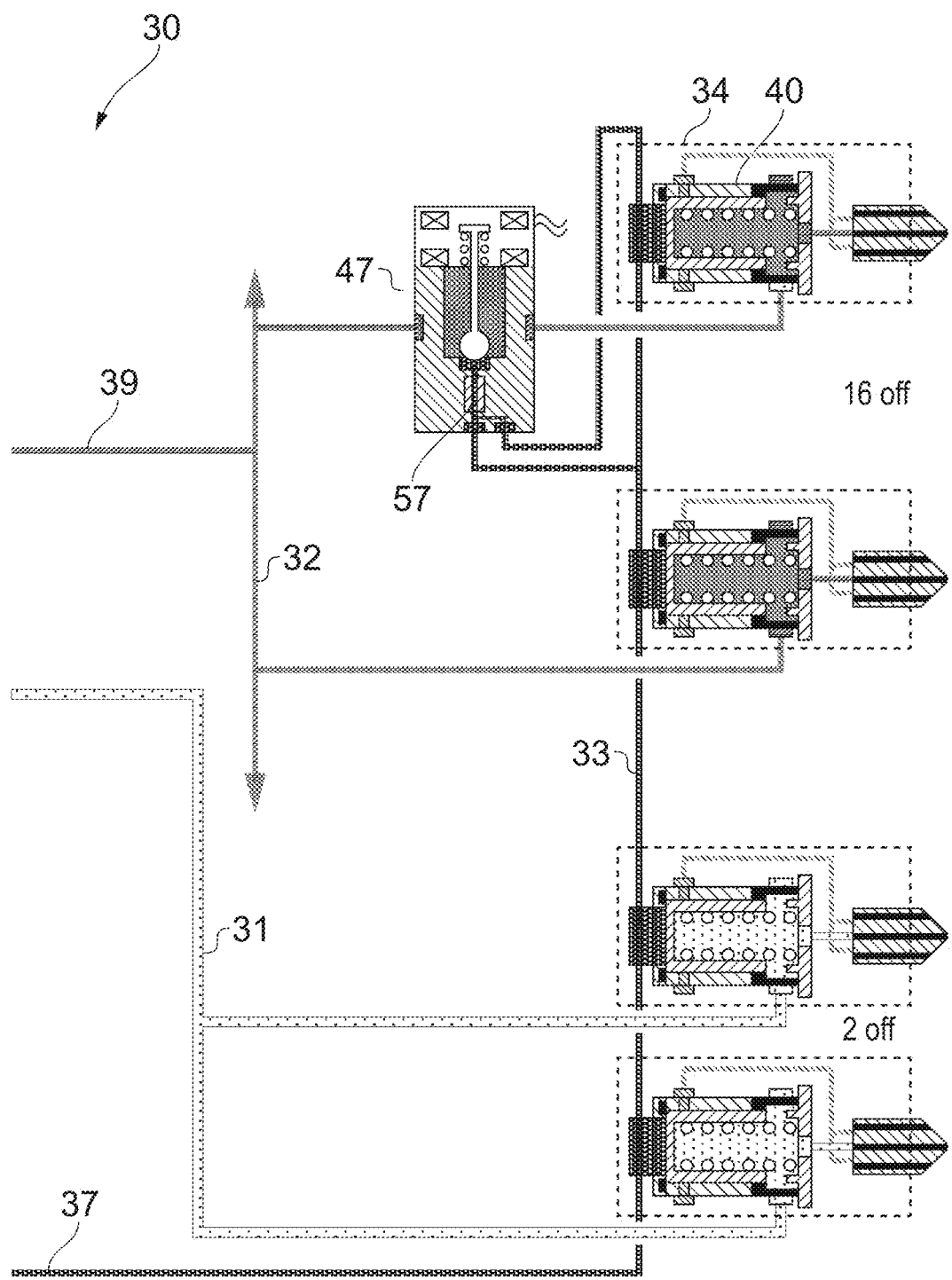

A key difference between the staging system 30 shown in FIG. 3 and the known system 130 shown in FIG. 1 is that the splitting unit 50 has a fuel flow metering and spill architecture rather than a fuel flow splitting valve and a fuel flow sensing valve.

More particularly, the splitting unit 50 has a staging metering valve (SMV) 51 providing a variable metering orifice with a known, and accurately controlled, relationship between area and position. Control of the position of a spool of the SMV allows control of the metering orifice area. The position of the metering piston is measured using a position sensor, such as an LVDT 53, and its velocity is controlled using a two stage servo-valve (MSV) 54. A spill valve (SSV) 52 of the splitting unit 50 controls the pressure differential set across the metering orifice such that control of metering valve position gives accurate control of flow delivered by the SMV into the mains connection pipe 37, this flow being the mains fuel flow sent to the mains manifold 33.

However, the fuel flow delivered through the SMV 51 is only a first portion of the HMU total metered fuel flow received by the splitting unit 50. A second portion of the received total metered fuel flow passes through a staging spill valve (SSV) 52 into the pilot connection pipe 36 to form the pilot fuel flow. The SSV can be a two-stage valve, with a pilot (first) stage of the SSV sensing the pressure differential set across the SMV and varying the position of a second stage piston to vary the area of the spill profile. Opening the spill profile of the SSV permits more spill flow to pass to the pilot connection pipe and thus reduces the mains fuel flow from the SMV (as the mains flow+the pilot flow=HMU total metered fuel flow). The converse is true for SSV closure.

An advantage of the fuel flow metering and spill architecture of the splitting unit 50 is that control of the pressure drop across the SMV 51 can be achieved hydro-mechanically and is therefore capable of a significantly higher bandwidth than can be achieved with the control arrangement outlined in US 2016/0273775. More accurate control of metered flow during transients can thus be achieved, such as when the metered total fuel flow is changing, flow split is changing, or mains is being staged-in or out. Transient dips and spikes in fuel flow risk engine surge or flameout, so their reduction is important.

The SMV 51 is used to meter flow to the mains connection pipe 37 when mains is both staged-in or staged-out. In the latter case, a residual metered flow from the SMV can be used to form the cooling flow sent to the mains manifold 33 during pilot-only operation. For example, when the spool of the SMV moves into a position corresponding to pilot-only operation it could open an additional port on the SMV (not shown in FIG. 3) to open the cooling flow path. However, as shown in FIG. 3, another option is for the two-stage SSV 52 to meter a fixed flow in parallel to the SMV metering orifice. This flow is formed from a third portion of the received total metered fuel flow and is taken from a flow washed filter (SFWF) 56 at the inlet to the splitting unit 50. It then passes through a fixed servo orifice (SSO) 55 before passing through a variable poppet orifice within the SSV into the mains connection pipe downstream of the SMV. The rate of this fixed flow can be aligned with the cooling flow required to cool the mains manifold, allowing the SMV to be fully closed in pilot-only operation. This arrangement advantageously reduces the risk of excessive cooling flows resulting from any SMV control problems. In particular, such excessive cooling flows can increase the risk of undesired opening of the FSVs 40. The two-stage SSV is also more robust than a single-stage spill valve to fuel borne contamination and coking, and thus provides better control of flow splitting between pilots and mains, which in turns offers better control of engine emissions. However, this does not exclude that the splitting unit could use a single-stage SSV instead of the two-stage SSV shown.

The metering and spill architecture of the splitting unit 50 is made possible by the need to maintain flow in the both the pilot manifolds 31, 32 and the mains manifold 33 when the engine is running. In pilots-only mode of operation, cooling flow is metered into the mains manifold for cooling purposes and re-joins the pilots burnt flow stream via the solenoid-operated mains cooling valve 47.

A non-return valve 57 can be added to the bypass connection controlled by the mains cooling valve 47 between the second pilot manifold 32 and the mains manifold 33. The non-return valve accommodates a scenario where one of the FSVs 40 has failed open when mains is staged-out. Without the non-return valve it would be possible for pilot flow to pass from the second pilot manifold to the mains manifold. This flow would increase as the pressure differential across the pilot discharge orifices of the fuel injectors increases. Passing to the mains combustion zone through the failed FSV, the flow could result in localised heating of turbine components, leading to a reduction of turbine life and possible turbine failure.

The mains cooling valve 47 can be located in any part of the fuel supply system as long as its hydraulic connections are maintained. For example, rather than positioning it close to the injectors 34 as shown in FIG. 3, it can be housed in the more benign environment of the splitting unit 50. Additionally or alternatively, it could be a hydraulically-operated valve operated, for example, using a hydraulic signal derived from the position of the SMV 51 rather than a solenoid-operated valve.

Drain down of the manifolds 31, 32, 33 following engine shut-down can be achieved by opening a connection to a drains tank within the main fuel control. Opening a connection to a drains tank permits fuel to be reverse purged from both pilots manifolds 31, 32 under the influence of the higher combustion pressure, to the drains tank via the SSV 52 and the delivery line between the staging system 30 and the HMU. Purging of the mains manifold 33 can be performed via the mains cooling valve 47 and the SMV 51, both of which can be controlled to be open to maximise the mains purging.

As mentioned above, the staging system 30 includes a lean blow out protection valve (LBOV) 41 controlled by way of a solenoid-operated control valve (LBSV) 42. The high pressure feed for the LBSV can be configured to be taken from the SFWF 56 at the inlet to the splitting unit 50. Any leakage flow from this feed then returns to the second pilot manifold 32 via the connection pipe 39. Benefits of such a servo supply for the LBOV are:

1. The leakage into the second pilot manifold 32 when the engine is running is part of the HMU metered total fuel flow, reducing the potential for delivery of incorrect flow levels to the engine.
2. When the engine is shut-down, fuel cannot leak into the staging system 30 via the LBOV 41. In the staging system 130 of FIG. 1, such leakage from HPf is possible if the seal of the solenoid operated control valve 142 is not drip tight when its plunger is in the position shown in FIG. 1.

It would be possible to configure the splitting unit 50 such that the metered flow stream from the SMV 51 is directed to the pilot connection pipe 36 to form the pilot fuel flow and the mains flow is formed from the remaining spill through the SSV 52. However, in this case the spill through the SSV 52 would need to be controlled quite accurately to produce the cooling flow when mains is staged-out. Metering the pilot flow means that the residual mains flow is the difference between the HMU metered total flow and metered pilot flow. Inaccuracies in metering either of these flows could result in too wide a range of cooling flows. In particular, too low a cooling flow could cause excessive fuel temperatures in the de-staged mains line, while too high a cooling flow could risk opening the FSVs 40 as a result of an excessive pressure differential between mains and pilot when mains is de-staged.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A combustion staging system for fuel injectors of a multi-stage combustor of a gas turbine engine, the system comprising:

a splitting unit which receives a metered total fuel flow and controllably splits the metered total fuel flow into a pilot fuel flow, which is out-going, and a mains fuel flow, which is out-going, to perform pilot-only staging control or pilot-and-mains staging control of the combustor, wherein for the pilot-only staging control only the pilot fuel flow is formed from the metered total fuel flow by the splitting unit, and for the pilot-and-mains staging control both the pilot fuel flow and the mains fuel flow are formed from the metered total fuel flow by the splitting unit;

a allot fuel manifold to receive the pilot fuel flow and a mains fuel manifold to receive the mains fuel flow;

wherein the splitting unit includes a metering valve and a spill valve, a first portion of the metered total fuel flow received by the splitting unit being an inflow to the metering valve and a second portion of the metered total fuel flow received by the splitting unit being an inflow to the spill valve, the metering valve being configured to controllably determine a fuel flow rate of a metered outflow as the first portion of the metered total fuel flow, the spill valve being configured to produce a spilled outflow as the second portion of the metered total fuel flow, and the spill valve being further configured to sense a pressure differential between the inflow to the metering valve and the metered outflow from the metering valve and to vary the amount of the spilled outflow in response to the sensed pressure differential, whereby the metered outflow forms the mains fuel flow, and the spilled outflow forms the pilot fuel flow; and wherein the splitting unit sends a cooling flow to the mains fuel manifold during the pilot-only operation.

2. A combustion staging system according to claim 1, wherein the metering valve has a spool whose position is controllable to determine the fuel flow rate of the metered outflow.

3. A combustion staging system according to claim 2, wherein the metering valve further has a device to measure the position of the spool.

4. A combustion staging system according to claim 1, wherein the system further has a mains cooling valve which, during the pilot-only operation, opens a bypass connection between the mains fuel manifold and the pilot fuel manifold such that the cooling flow passes from the mains fuel manifold to the pilot fuel manifold.

5. A combustion staging system according to claim 4, wherein the spill valve sends some or all of the cooling flow to the mains fuel manifold during the pilot-only operation.

6. A combustion staging system according to claim 5, wherein the spill valve receives a third portion of the metered total fuel flow and forms some or all of the cooling flow therefrom.

7. A combustion staging system according to claim 4, wherein the system further has a non-return valve in the bypass connection which prevents flow in a direction from the pilot fuel manifold to the mains fuel manifold.

8. A combustion staging system according to claim 1, the staging system further having a plurality of mains flow scheduling valves which distribute the mains fuel flow from the mains manifold to mains discharge orifices of a res ective iniector of the fuel injectors of the combustor.

9. A combustion staging system according to claim 8, wherein each of the plurality of mains flow scheduling valves has a chamber contain ng a movable piston, the chamber to a mains side of the piston being in fluid communication with the mains fuel manifold, the piston being biased towards a closed pilot-only position which prevents flow out of the mains side of the chamber to the mains discharge orifice of the respective injector, and the piston being movable under an increase in pressure in the mains fuel manifold to an open pilot-and-mains position which allows the flow out of the mains side of the chamber to the mains discharge orifice of the respective injector.

10. A combustion staging system according to claim 8, wherein the mains flow scheduling valves also pass the pilot fuel flow from the pilot manifold to pilot discharge orifices of the respective injector.

11. A combustion staging system according to claim 10, wherein the chamber to a pilot side of the piston is in fluid communication with the pilot fuel manifold.

12. A fuel supply system having:
a fuel metering valve which is configured to receive a flow of pressurised fuel and to form therefrom the metered total fuel flow; and
the combustion staging system according to claim 1, the splitting unit of the combustion staging system receiving the metered total fuel flow from the fuel metering valve.

13. A gas turbine engine having the fuel supply system according to claim 12.

* * * * *